United States Patent [19]
Hill

[11] 3,850,347
[45] Nov. 26, 1974

[54] COMBINATION DISPENSER PACKAGE WITH PORTION MEASURING MEANS FOR DISPENSING CONTROLLED AMOUNTS OF FLUENT MATERIALS

[75] Inventor: Charles O. Hill, Round Rock, Tex.

[73] Assignees: Gayle Pate Hill; Thomas W. Budnick, both of Austin, Tex. ; part interest to each

[22] Filed: June 14, 1973

[21] Appl. No.: 369,879

[52] U.S. Cl. .................................. 222/368, 222/454
[51] Int. Cl. ............................................. G01f 11/10
[58] Field of Search .......... 222/368, 367, 427, 444, 222/454–456, 424.5, 425, 23, 41, 426

[56] References Cited
UNITED STATES PATENTS

| | | | |
|---|---|---|---|
| 2,054,743 | 9/1936 | Fend | 222/368 UX |
| 2,740,555 | 4/1956 | Howden | 222/456 X |
| 2,880,915 | 4/1959 | Kantor | 222/456 |
| 3,734,361 | 5/1973 | Brucker et al. | 222/556 |

FOREIGN PATENTS OR APPLICATIONS 597,660   9/1959   Italy ................................... 222/368

Primary Examiner—Evon C. Blunk
Assistant Examiner—James M. Slattery
Attorney, Agent, or Firm—M. E. Shafer

[57] ABSTRACT

A proposed dispenser package provided with a customer manually operated mechanical device adapted to scoop up a predetermined and controlled amount of fluent or granular material such as measured quantities of soap powder and deliver said measured quantity of material through a dispenser port opening into a selected container or area.

10 Claims, 8 Drawing Figures

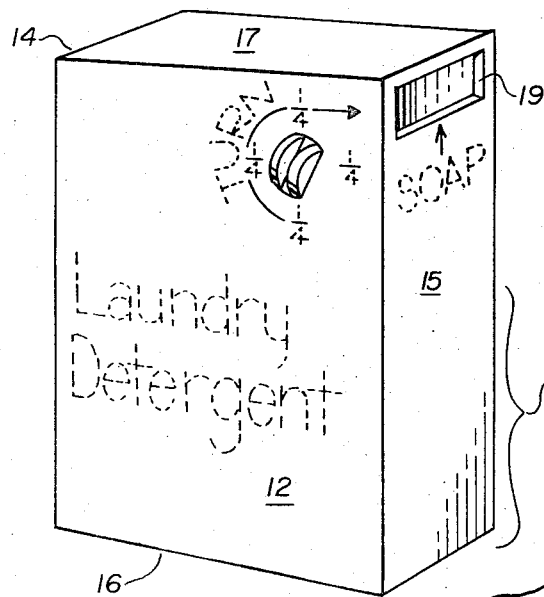
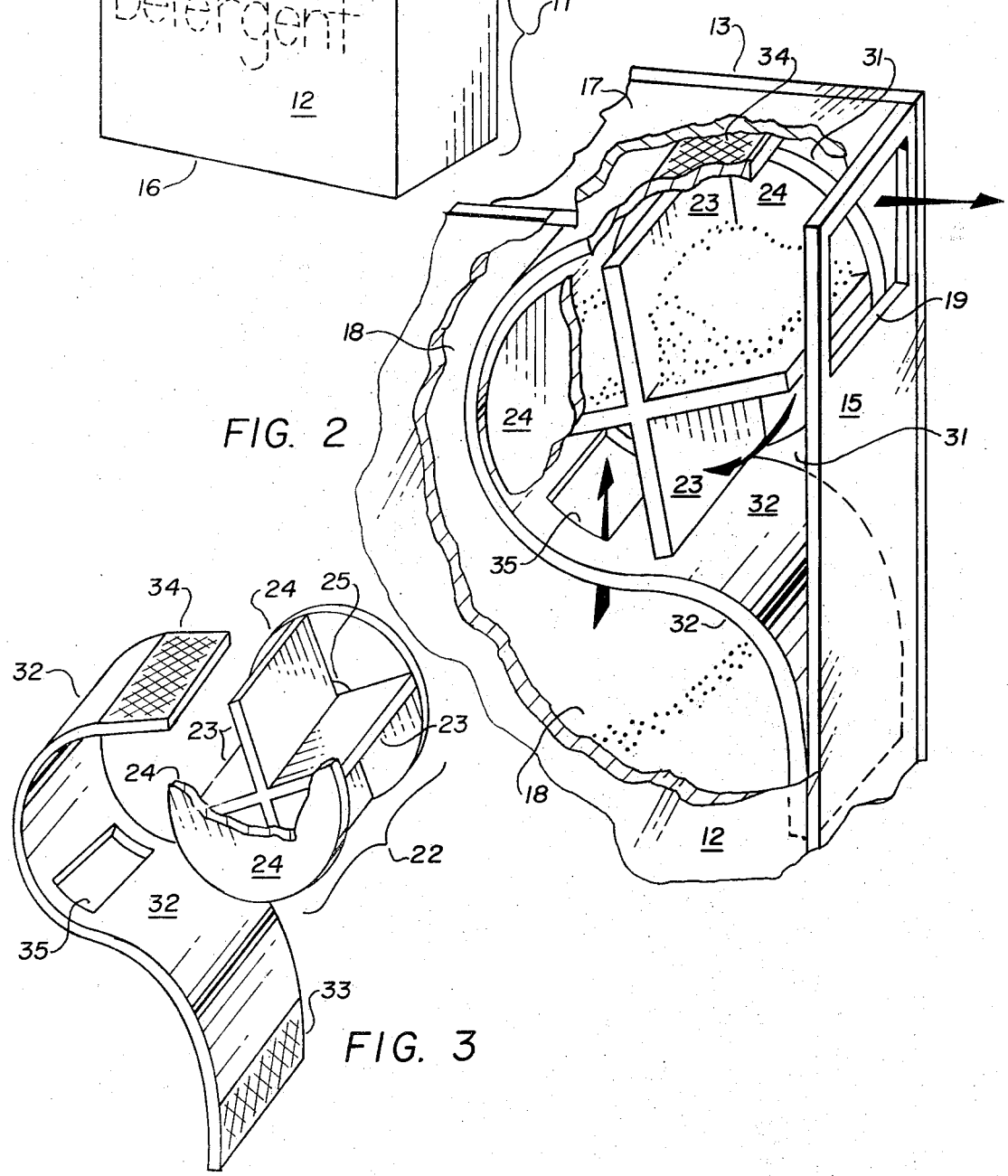

COMBINATION DISPENSER PACKAGE WITH PORTION MEASURING MEANS FOR DISPENSING CONTROLLED AMOUNTS OF FLUENT MATERIALS

SUBJECT MATTER OF THE INVENTION

This Invention relates to dispenser packages and more specifically relates to dispenser packages provided with metering apparatus for delivery of a controlled amount of flowable material.

OBJECTS OF THE INVENTION

A major object of the Invention is to provide a convenient sized customer operated dispenser package for a fluent or flowable material such as soap powder or detergent with said package being provided with customer-operated means by which a predetermined but limited quantity of said fluent material may be dispensed from the package into a device such as a washing machine with the quantity of material being delivered being premeasured to the required amount necessary for laundering a single washer load of soiled clothing.

Another object of the Invention is to so incorporate the fluent measuring apparatus into the dispenser package in such manner as to eliminate the loss or mislaying of separable measuring devices.

A further object of the Invention is to fabricate the metering or measuring apparatus into a separate insertable module capable of being incorporated into a conventional dispenser package with minimal structural changes in the package.

A still further object of the Invention is to provide such a fluent dispensing package with portion measuring apparatus with such simplicity of operation that the customer can quickly and easily learn to operate the measuring and dispensing apparatus by ordinary observation of the surface portions of the package.

Still another object of the Invention is to so devise and construct the portion measuring apparatus that it involves minimal parts and occupies only a small corner of a conventional materials package.

A still further object of the Invention is to provide said dispenser package with portion-measuring apparatus of such simplicity that it is easily and inexpensively fabricated and installed in said dispensing package.

Still another object of the Invention is to provide customer operated means by which large or multiple portions of said flowable fluent material may be quickly and accurately dispensed by convenient manual means when larger quantities of the fluent materials are needed.

DESCRIPTION OF THE SEVERAL VIEWS OF THE DRAWINGS

FIG. 1 is a perspective view of the exterior appearance of a dispenser package of a type comtemplated by this Invention.

FIG. 2 is a partial perspective cut-away view of an upper corner of the dispenser package showing one means by which portion measuring apparatus may be mounted in said dispenser package.

FIG. 3 is an exploded view of the rotatable portion metering wheel and housing cover for the metering apparatus.

Figure 4:
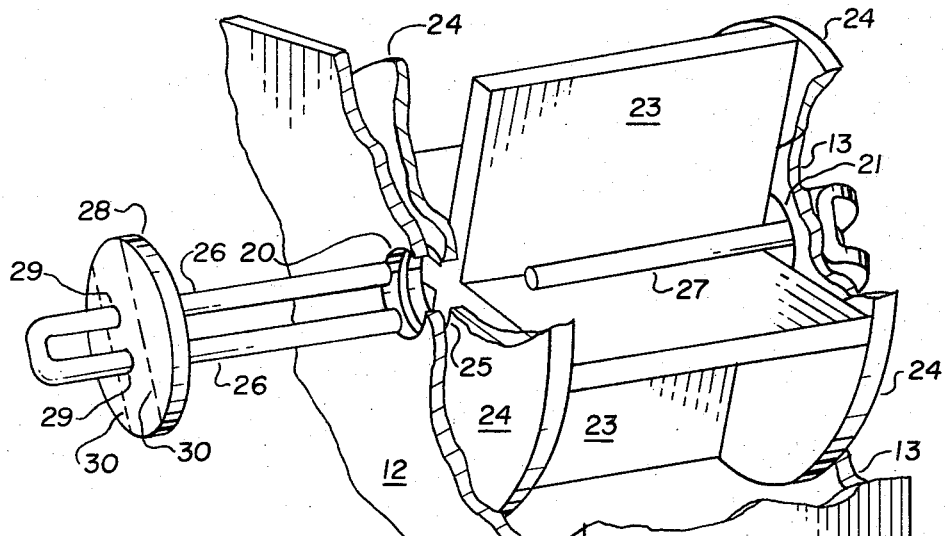
FIG. 4 is a partial cut-away perspective of the portion measuring scoop fins and wheel showing the means by which said portion measuring wheel is operated by means of thumb-manipulated tabs mounted on the side of the dispenser package.

In describing one selected form of preferred embodiment of this Invention as shown in the drawings and in this Specification, specific terms and components are used for clarity. However, it is not intended to limit the claimed Invention to the specific form, components, or construction shown and it is to be understood that the specific terms used in this illustration of the Invention are intended to include all technical equivalents which operate in a similar manner to accomplish a similar purpose.

DETAILED DESCRIPTION OF PREFERRED EMBODIMENT OF INVENTION

A preferred embodiment should be incorporated into and would include an overall conventional consumer package 11 which would be of a generally rectangular shape and of such convenient size and proportions as to facilitate easy carrying and manual manipulation of the package during dispensing operations and of such general character in external appearance as illustrated in FIG. 1 of the associated drawings. Such combination dispenser package 11 would have conventional front panel 12, back panel 13, left side panel 14, right side panel 15, bottom panel 16 and top panel 17 enclosing and defining an internal storage compartment 18 for receiving and holding powdered or granular flowable materials such as detergents or soap laundering powder. Said package should also be provided with a fluent dispensing port opening 19 located at an intermediate point on one of the side panels near what may be defined for purposes of this illustration as the upper end of said combination dispenser package 11. The blanks for said package together with suitable glue flaps may be manufactured along patterns and methods already well known in the package fabrication arts. No attempt has therefore been made to illustrate or describe these conventional subordinate parts of the package. At an intermediate point near the upper end and one side of front and back panels 12-13 at points opposite each other there is provided a pair of aperture openings 20 and 21 which will serve as bearing apertures for the axis support rods that will be described in connection with the quantity measuring apparatus.

One of the problems connected with the use of automatic washing or laundry machines is that it is fairly important to use a precise amount of laundry powder or detergent lest the laundry be inadequately cleaned or, if an excessive amount of detergent is used, the laundry machine may run over with excessive soap suds and the rinsing cycle may not be able to get excessive detergent out of the clothes. Residual detergent and bleach chemicals left in laundred clothing can cause uncomfortable allergic reactions and skin rashes as well as accelerate deterioration of the clothing. It is therefore always desirable to carefully measure out the recommended amount of soap powder or detergent that should be used in a washer load of laundry. Various measuring containers have been improvised and provided for performance of this measuring function but they invariably get separated from the laundry detergent box and cannot be found at the moment when they are needed. It is therefore the purpose of this invention and combination dispenser package to provide a convenient manually operated portion measuring device that is built into said dispenser package 11 in such manner that the dispenser is there when the laundry detergent needs to be used.

The portion measuring apparatus recommended for dispensing controlled amounts of fluent materials by this invention employ a rotatable fluent measuring and carrying scoop paddle wheel 22 in which a plurality of at least four or more spaced apart radial scoop panels or vanes 23-23-23 involving generally rectangular flat extended paddle surfaces placed at equal distant radial positions from the axis of said fluent material measuring and carrying scoop wheel 22. This assembly of radially positioned scoop paddles or vanes 23—23 are held together as a rotating wheel by means of left and right disc shaped wheel confining frame members 24—24 with each of said disc shaped frame members 24—24 being provided with axial bearing apertures 25—25 to provide for the passage of axial support rods through the center of said scoop wheel 22. Said portion measuring scoop wheel assembly 22 is rotatably positioned near one side and near the upper end of dispenser-package 11 by means of a pair of hairpin or generally U-shaped axis support rods 26—26 and 27—27, which axial support rods 26—26 and 27—27 pass through aperture 20 in front panel 16, through aperture 25 in disc shaped frame 24 through and parallel to the axial junction of oppositely positioned pairs of radial vanes 23—23 and 23—23 while the oppositely disposed pairs of axial support rods 27—27 extends from and through package back panel 13 by means of aperture 21 thense through and parallel to the alternate axial junction of oppositely positioned pairs of radial vanes 23—23 as illustrated in FIG. 4 of the drawings so that said portion measuring scoop wheel 22 is rotatably mounted between the walls of front panel 12 and rear panel 13 as illustrated in FIG. 2 and in FIG. 4.

Figure 5:
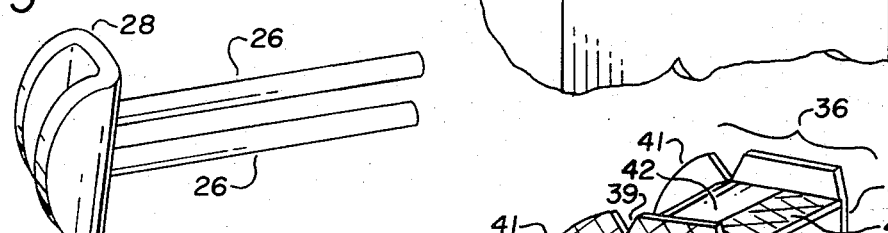
FIG. 5 and FIG. 6 are differently positioned perspective views of said thumb operated tabs with associated torque transmitting arms.
Figure 6:
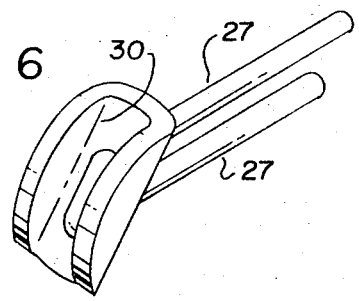

Generally U-shaped pairs of axis support rods 26—26 and 27—27 are prevented from pulling through the walls of front panel 12 and rear panel 13 by means of disc-shaped tabs 28—28 which are provided with a pair of slightly spaced apart apertures 29—29 through which the opposing arms of axis support rods 26—26 and 27—27 are passes so that tab 28 is slid up to the apex of said paired axis support rods, as shown in FIGS. 4, 5 and 6 to form stop means that ride on the outside of the front and back panels of package 11 and that prevent said axis support rods 26—26 and 27—27 from pulling through the front and back panels of the package. These disc-shaped tab plates 28—28 may be fabricated from sheets of thin metal material and are provided with indented score lines 30—30 at spaced apart intervals so that they may be folded upward to form handles or thumb-manipulated tabs 28—28 as shown in FIG. 5 and FIG. 6 and by means of these thumb-manipulated tabs 28—28 rotary motion may be transmitted by means of the associated torque transmitting arms of U-shaped axis support rods 26—26 and 27—27.

Said material scooping and portion measuring paddle wheel 22 is enclosed in its own measuring chamber 31 by means of a generally reverse question mark shaped portion measuring housing partition 32 which extends transversely from front panel 12 to rear panel 13 of package 11 while the bottom portion of said reverse question mark shaped partition 32 starts from a glue strip 33 which attaches to side panel 15 at an intermediate point about half-way up from the bottom of said side panel 15; and the alternate or top end of said question mark shaped partition 32 extends to and attaches to top panel 17 by means of glue strip 34 thus confining the portion measuring apparatus within its own separate housing and measuring chamber 31 which is separated from the general detergent storage chamber 18 provided within the six walls of package 11. When detergent package 11 is manually manipulated so as to tilt the upper right-hand corner of package 11 into a downward position for dispensing of laundry detergent the granular or flowable detergent in storage chamber 18 will flow against the shoulder of reverse question mark shaped partition 32 where a sized input port opening 35 permits laundry detergent to flow into the scooping and measuring space between two of the adjacent radially spaced scoop fins or vanes 23—23 so that exactly enough detergent to clean one washer load of laundry is stored between said pair of scoop measuring and carrying fins 23—23. As said measuring paddle wheel 22 is operated by the user's rotation of thumb-manipulated tabs 28—28 and associated torque transmitting arms of axis supporter rods 26—26 and 27—27, said measured quantity of laundry detergent or other flowable, granular material is delivered to and through fluent output dispensing port opening 19 from whence it may be directed into an open washing machine or other useful container.

Figure 7:
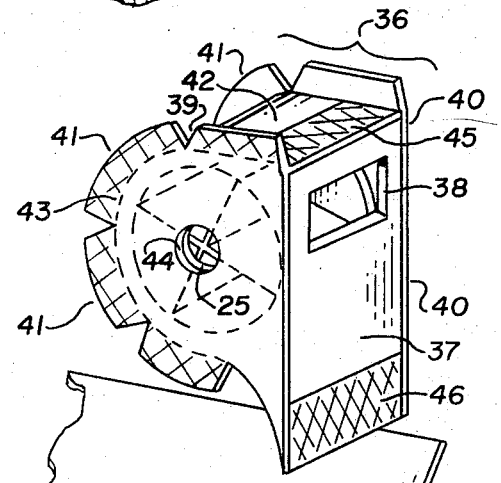
FIG. 7 is an exploded perspective view of an alternate version of the dispenser package contemplated by this Invention in which the portion-measuring apparatus is fabricated in the form of a separate self-contained module that can be readily inserted in an already fabricated conventional dispenser package.

The above described embodiment of the Invention as illustrated in FIGS. 1 through 4 contemplate incorporation or fabrication of said portion measuring apparatus as an integral part of detergent package 11. Experience with commercial manufacturing may, however, indicate that it is desirable to fabricate the exterior portions of package 11 as a separate item and to separately manufacture the portion measuring apparatus as an insertable module that can be added after construction of the package as illustrated in FIG. 7 of the drawing. Portion measuring apparatus insert 36 includes a front insert housing panel 37 which is of such size and shape as to fit just inside of side panel 15 in such manner that enter-exit port 38 provided in panel 37 coincides with fluent material dispensing port opening 19. The remainder of the housing for said portion measuring apparatus insert includes left and right insert housing panels 39 and 40 which are provided with suitable glue tabs 41 to enable the the insert to be attached to the interior of package 11 while insert housing top panel 42 and reverse question-mark shaped housing panel 43 fit together in such manner as to surround and enclose the portion measuring apparatus previously described. Reverse question-mark shaped housing panel 43 is the equivalent of partition panel 32 and housing panel 43 is also provided with an equivalent sized input port opening 35 which is the equivalent of the port illustrated in FIG. 2 of the drawings even though said equivalent port 35 cannot be seen in FIG. 7 of the drawings because of the manner in which portion measuring apparatus insert module 36 is illustrated. Said left and right insert housing panels 39 and 40 are provided with axial bearing apertures 44—44 which mesh with axial bearing apertures 25—25 in disc-shaped wheel confining frame members 24—24 which will also be in alignment with aperture openings for axis support rods 20–21 in package 11 when the insert is mounted inside said package 11. Glue strips 45 and 46 or equivalent connective and securing means are to provide means for mounting and holding said portion measuring apparatus insert module 36 in its proper aligned position within the upper right-hand corner of package 11.

Figure 8:
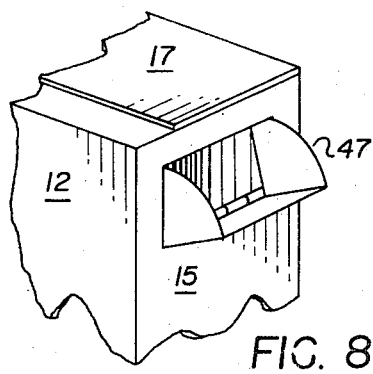
FIG. 8 is a perspective view of an alternate version of the package output port with a recloseable spout.

The packages illustrated in FIGS. 1 through 7 all illustrate a material dispensing port opening 19 which is simply a rectangular aperture. The box could be fabricated with such a simple rectangular output port 19 or it could be fabricated with a perforated flap opening analogous to those now provided in breakfast cereal boxes and well known in the art. The Inventor has not recommended or claimed a particular or distinctive type of output opening 19. However, experience with the package may indicate that it is desirable to have a reclosable pull-out dispensing spout in the nature of a pivoted or hinged combination pouring spout and closure 47 as illustrated in FIG. 8 of the drawings associated with output port opening 19 in such manner that said combination spout and closure 47 can be rotated outward for accurate pouring of the material to be dispensed while said combination spout-closure 47 may be pressed backward into the box until said spout-closure 47 is flush with package panel 15 so that the package is temporarily closed when the package is not in use.

OPERATION

Except for the space occupied by the fluent material measuring and carrying apparatus the process of filling measuring and dispensing package 11 with a flowable, fluent material in material storage compartment 18 will be handled in much the same manner as said operation is processed at this time.

At the consumer end the package will be opened by the customer manually tearing away or opening whatever closure material the manufacturer has used to close dispenser port opening 19. The customer will then hold and rotate dispenser package 11 into a downward tilt position such that fluent material eminating from exit port opening 19 will be directed into an open washing machine or other useful container. The customer then employs his thumb and forefinger to rotate tab 28 in such manner as to cause material measuring and carrying scoop paddlewheel 22 to move in a clockwise direction. The downward tilt position will cause granular or fluent material stored in the internal storage compartment 18 of package 11 to gravity feed flow through sized input port opening 35 in portion measuring housing partition 32 into measuring chamber 31 until it occupies all of the space between two of the adjacent radially spaced apart scoop panels or vanes 23—23 of measuring wheel 22 which quantity of material is programmed to be the amount required for laundering one washing machine load of clothing. When said measuring and carrying scoop paddlewheel 22 had been rotated sufficiently for the loaded compartment to open into and through exit port 19 one measured portion of laundry detergent or other fluent material will have been dispensed. Each subsequent 90° rotation will deliver one additional portion of measured fluent material. When the customer has dispensed the desired quantity of fluent material said dispenser package 11 is restored to its vertical or upright position and further rotation of control tab 28 will sweep the unused portions of fluent material in the measuring compartments of scoop paddlewheel 22 through partition port 35 back into the main storage chamber 18 of package 11. Since paddle-wheel 22, in the absence of activation, blocks the passage of fluent material from main package storage compartment 18 to dispensing port 19 it may not be necessary to have additional closure means provided for dispenser port opening 19. However, if the combination spout-closure mechanism illustrated in FIG. 8 has been provided, then said hinged spout-closure 47 should be rotated to its closed position while the package is not in active use.

ADVANTAGES

A primary advantage of the Invention is that it provides an attractive and convenient simple customer operated dispenser package for fluent or flowable materials such as soap powder or detergent by which the customer may manually measure and dispense a predetermined but limited quantity of fluent material from the package into a device such as a washing machine with the quantity of material dispensed being premeasured to the required amount necessary for laundering a single washer load of soiled clothing.

Another advantage of this Invention is that it incorporates the fluent portion measuring apparatus into the dispenser package in such manner as to eliminate the inconvenience of mislaying the measuring apparatus -- which is a common danger and inconvenience when separable measuring devices are employed.

Another advantage of the Invention is that it provides a fluent dispensing package with portion measuring apparatus of such simplicity of operation that the customer can quickly and easily learn to operate the measuring and dispensing apparatus by ordinary observation of the surface portions of the package.

A further advantage of the Invention is that it provides simple customer operated means by which multiple portions of said flowable, fluent material may be quickly and accurately measured and dispensed by convenient manual means when larger quantities of the fluent material are needed.

A still further advantage of the particular portion measuring apparatus describe herein is that said metering and measuring apparatus may be readily separately fabricated into a separate insertable module that is capable of being incorporated into a conventional dispenser package with minimal structural changes in the package.

Although this specification describes but a single embodiment of the Invention with certain applications thereof, it should be understood that structural or material rearrangements of adequate or equivalent parts, substitutions of equivalent functional elements and other modifications in structure can be made and other applications devised without departing from the spirit and scope of my Invention. I therefore desire that the description and drawings herein be regarded as only an illustration of my Invention and that the Invention be regarded as limited only as set forth in the following claims, or as required by the prior art.

Having thus described my invention, I claim:

1. A combination dispenser package with portion measuring means for dispensing controlled amounts of fluent materials, comprising:
   A. a conventional consumer package with an output dispensing port near the upper end of the consumer package;
   B. scooping and portion measuring apparatus having a plurality of portion measuring pockets built into said consumer package and positioned to deliver measured portions of fluent material to and through the output port of said consumer package;
   C. rotatable control means for causing said measuring apparatus to separate and dispense one portion of said fluent material from said dispenser package;
   D. a reverse question mark shaped partition structure located in an upper corner of said dispenser package adjacent to the output port dividing the interior of said dispenser package into a separate material storage compartment and a separate measuring chamber housing the scooping and measuring apparatus with said partition structure having
      1. glue tabs to secure the partition in its proper position within the dispenser package, and
      2. a rectangular port opening through said partition structure adapted to permit granular material to gravity feed flow from the material storage compartment through said rectangular port into one of the pockets of the scooping and portion measuring apparatus when the dispenser package is held with the dispensing port pointed downward and which will permit unused granular material to be swept back through the same opening in said partition structure into the storage compartment when the package is held in upright position and the control means for the scooping and measuring device is rotated such that there is no surplus granular material in the scooping and measuring apparatus to leak out after usage.

2. The combination dispenser package with portion measuring means for dispensing controlled amounts of fluent materials described in claim 1 together with indicia means printed on the exterior of the package indicating the amount of rotation required to dispense individual portions of said fluent material.

3. The combination dispenser package with portion measuring means for dispensing controlled amounts of fluent materials described in claim 1 together with a hinged combination pull-out, recloseable spout and closure.

4. The combination dispenser package with portion measuring means for dispensing controlled amounts of fluent materials described in claim 1 together with
   A. provision of an axis support mounting structure positioned transversely across the dispenser package to support the rotatable scooping and portion measuring apparatus;
   B. the ends of said axis structure extending through the side walls of said dispenser package; and
   C. a metal disc knob means mounted flat against the outside walls of the dispenser package on each end of axis support mounting structure with each of said pair of metal disc knob devices provided with indented score lines such that when the dispenser package is ready for use the metal disc knobs may be folded upward along the indented score lines to provide thumb-manipulated rotation tabs.

5. A combination dispenser package with portion measuring means for dispensing controlled amounts of fluent materials, comprising:
   A. a conventional consumer package having
      1. a generally rectangular shape and convenient size and proportions for easy carrying and manual manipulation of the package during the dispensing operation,
      2. an internal storage compartment for receiving and holding flowable materials,
      3. a fluent dispensing port opening at an intermediate point near one end of the package, and
      4. a pair of apertures positioned on opposite sides of the package to serve as bearing apertures for axis support rods for quantity measuring apparatus;
   B. a rotating fluent material measuring and carrying wheel mounted in the upper portion of said package and having,
      1. a plurality of spaced apart radial vanes on an axis, said vanes being
         a. flat extended surfaces, and
         b. placed equidistant around the axis
      2. rotatably mounted on a pair generally U shaped axis support rods, and
      3. having disc shaped left and right wheel confining frame members
         a. attached to each end of the spaced apart flat extended scoop surfaces, with
         b. axial bearing apertures at the center of each disc for passage of the axial support rods;
   C. a generally reverse question-mark shaped portion measuring housing partition, with
      1. glue strip attaching means at the upper and lower ends of said portion measuring housing partition, and
      2. a size input opening through said measuring housing partition into a
   D. measuring chamber that separately houses the scooping and measuring apparatus.

6. The combination dispenser package with portion measuring means for dispensing controlled amounts of fluent materials described in claim 5 with indicia means printed on the exterior of the package indicating the amount of rotation required to dispense each portion of said fluent material.

7. The combination dispenser package with portion measuring means for dispensing controlled amounts of fluent materials described in claim 5 together with a hinged combination pull-out, recloseable spout and closure.

8. A combination dispenser package with portion measuring means for dispensing controlled amounts of fluent materials, in which the portion measuring apparatus is assembled and housed in a separate insertable module, said combination comprising;
   A. a conventional consumer package having
      1. a generally rectangular shape and convenient size and proportions for easy carrying and manual manipulation of the package during the dispensing operation.
      2. an internal storage compartment for receiving and holding flowable materials,
      3. a fluent dispensing port opening at an intermediate point near one end of the package, and 4. a pair of apertures positioned on opposite sides of the package to serve as bearing apertures for axis support rods for quantity measuring apparatus;

B. a separately fabricated and separately structured portion measuring and carrying module assembled in its own housing module and tailored to insert into and be mounted within an upper side corner of said dispenser package with said housing for the separate measuring insert module having
1. a front insert housing panel with a positioned enter-exit port,
2. left and right insert housing panels with
   a. suitable glue tabs for mounting said dispenser package, and
   b. an axial bearing aperture being provided in each of said left and right side panels;
3. a generally reverse question-mark shaped panel forming the top, rear and bottom portions of said insert module housing structure with
   a. a sized input port opening through said reverse shaped question-marked housing, and
   b. suitable glue strips for attaching said insert module housing within the dispenser package;

C. a rotating fluent material measuring and carrying wheel mounted within the interior cavity of said measuring apparatus insert module housing, with said fluent material measuring and carrying wheel having
1. a plurality of radially spaced apart vanes on an axis, said vanes being
   a. flat extended surfaces, and
   b. placed equidistant around the axis,
2. said paddlewheel scooping, measuring and conveying structure being rotatably mounted between a pair of disc shaped left and right wheel confining frame members
   a. attached to each end of the spaced apart flat extended scoop surfaces, with
   b. axial bearing apertures at the center of each disc for passage of axial support rods;

D. a pair of generally U-shaped axis support rods

E. a metal disc stop means mounted at the juncture of each of said U-shaped axis support rods and provided with indented score lines such that they may be folded upward to provide thumb-manipulated rotation tabs.

9. The combination dispenser package with portion measuring means for dispensing controlled amounts of fluent materials described in claim 8 with indicia means printed on the exterior of the package indicating the amount of rotation required to dispense each portion of said fluent material.

10. The combination dispenser package with portion measuring means for dispensing controlled amounts of fluent materials described in claim 8 together with a hinged combination pull-out, recloseable spout and closure.

* * * * *